UNITED STATES PATENT OFFICE.

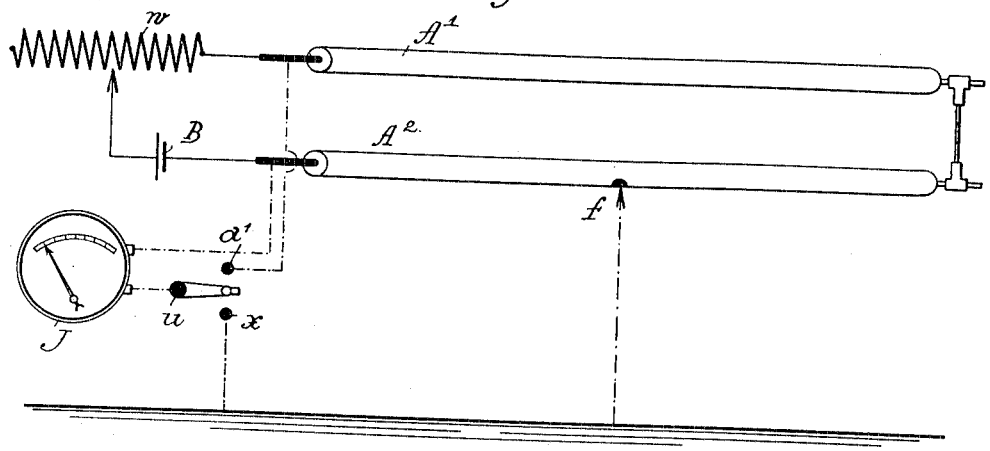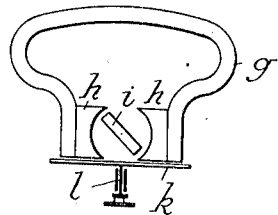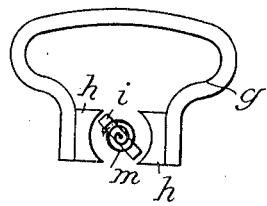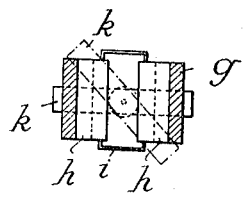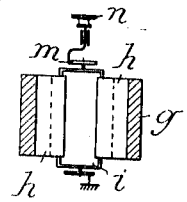

JULIUS HEINRICH JOHANN ADOLPF STEPHENSON, OF HAMBURG, GERMANY.

METHOD FOR LOCALIZING FAULTS IN CABLES AND CIRCUITS.

1,084,910.  Specification of Letters Patent.  Patented Jan. 20, 1914.

Application filed November 14, 1911. Serial No. 660,240.

*To all whom it may concern:*

Be it known that I, JULIUS HEINRICH JOHANN ADOLPF STEPHENSON, a citizen and resident of Hamburg, in the German Empire, have invented a new and useful Method for Localizing Faults in Cables and Circuits, of which the following is a specification.

In the measuring methods for ascertaining the place of defects in insulation which have been in use hitherto the so-called zero point method was employed or measurements were made which were based on the fall of pressure in the damaged cables. The deflections which were read in volts were calculated in proportion to the length of the cable. Calculations are therefore absolutely indispensable in these known methods though they may be limited to simple proportions. At any rate, this is a drawback which causes many managers to call in specialists for determining defects not only because they, being experts only as far as practical knowledge is concerned, cannot make the necessary calculations but also because the connections to be made are extremely difficult.

The present method enables any fitter, whether he has theoretical knowledge or not, to exactly ascertain defects because no calculations and no difficult connections are necessary. All that has to be done is to connect an instrument having a testing battery to the damaged cable, to adjust the hand of the instrument on the number of a scale which corresponds with the total length of the damaged cable, and then to turn a switch, whereupon the distance of the fault is indicated by the instrument.

Reference is to be had to the accompanying drawings in which—

Figure 1 shows an instrument for carrying out the method while Figs. 2 to 5 are details of apparatus which may be used in connection with the instrument.

$A^1$ and $A^2$ designate a cable for direct currents, part $A^2$ being connected to its lead sheathing or to the ground. The instrument has a testing battery B, a resistance $w$, which as here shown is in the battery circuit, a voltmeter or measuring instrument J, a secondary switch $u$, and terminals $a^1$ and $x$. A defect in cable $A^2$ is indicated at $f$. The opposite ends of cables $A^1$ and $A^2$ are connected together by a good metallic conductor.

For using the instrument, the battery B is connected to cables $A^1$ and $A^2$ over the resistance $w$. When switch $u$ is placed on terminal $a^1$ the voltmeter J will indicate the fall of pressure which the current from battery B undergoes in the cables. The voltage of said current is now so regulated by means of resistance $w$ that the hand of the voltmeter points on its scale a number which corresponds to the length of the cables $A^1$ and $A^2$. For instance, if the cable is 100 meters long, the current is so regulated that the hand of the voltmeter J points to "200", as the double length of the cable must be taken into account. Consequently, one division of the scale of voltmeter J corresponds to one meter of (double) cable, taking it for granted that the cross section of the cable is equal throughout. When the switch $u$ is turned on to the terminal $x$ the deflection will correspond to the distance measured from the commencement of the cable $A^2$. One terminal of the voltmeter is then connected with $A^1$ and the other terminal is connected to ground. The deflection of the pointer will then correspond with the distance of the commencements $A^1$ to $f$. This method which avoids every reckoning will only give correct results when the resistance created at the defect is not too great. If such is the case, the following will have to be taken into consideration. This method of measuring is, *per se*, independent of the amount of resistance at the damaged part, for the total length of the cable divided in proportion to the deflections of the voltmeter will always correspond to the distance of the defect from the measuring instrument. If there is considerable resistance at the damaged part this will be recognized by adding the data obtained when measuring both ways, because if it is found that the measured distance of the defect from both ends of the cable do not equal the total length of the cable, the difference can only be occasioned by the said resistance. Experience has shown that cases of this kind seldom occur. It does not matter whether the cable is composed of two, three or more conductors, and whether the deflection of the voltmeter J is controlled by a resistance or the like in the circuit of the voltmeter and not in that of the battery.

Instead of controlling the deflection by a resistance it might also be controlled by a shunt magnet in the voltmeter or also mechanically, say by a torsion apparatus constructed so as to allow of regulation. A shunt magnet instrument is illustrated in Fig. 2. $g$ is a magnet between the poles $h$ of which a coil $i$ is rotatably arranged and fixed to its shaft by the intermediary of a spiral spring, which spring is not shown. The angle at which the coil stands between poles $g$ is the resultant of the influence of the magnetic lines of force and the current in the coil $i$. The action of the magnet may be regulated by more or less short-circuiting it by means of an armature $k$ which can be adjusted by turning it on a pivot $l$ (see dotted lines in Fig. 3).

Figs. 4 and 5 illustrate a torsion apparatus. The parts have been designated with the same reference letters as in Figs. 2 and 3 as far as the parts are identical. The coil $i$ is here under the action of a spiral spring $m$ the torque of which can be regulated by means of a handle $n$ to which the end of spring $m$ is attached.

Preferably the dial of the voltmeter is made removable to allow of being replaced by a dial carrying a different scale. Such dial being chosen to correspond to the length of the complete cable. Thus the whole length of the scale can be utilized as far as possible.

I claim:

1. Method for ascertaining the place of a defect in the insulation of cables, consisting in placing a voltmeter in a shunt circuit of the closed circuit of the cable, adjusting the voltmeter so as to indicate the complete length of the cable in corresponding units of length, and finally switching the shunt circuit so as to connect one end with one terminal of the cable and the other end with the ground, to indicate the distance of the place of defect from the said terminal in the same units of length.

2. Method for ascertaining the place of a defect in the insulation of cables, consisting in placing a voltmeter in a shunt circuit of the closed circuit of the cable, adjusting the voltmeter so as to indicate the complete length of the cable in corresponding units of length, switching the shunt circuit so as to connect one end with one terminal of the cable and the other end with the ground to indicate the distance of the place of defect from the said terminal in the same units of length, and finally switching the shunt circuit so as to connect one end with the other terminal of the cable and the other end with the ground to indicate the distance of the place of defect from the said terminal in the same units of length.

3. Method for ascertaining the place of a defect in the insulation of cables, consisting in placing a voltmeter in a shunt circuit of the closed circuit of the cable, adjusting the voltmeter by means of a resistance so as to indicate the complete length of the cable in corresponding units of length, and finally switching the shunt circuit so as to connect one end with one terminal of the cable and the other end with the ground to indicate the distance of the place of defect from the said terminal in the same units of length.

4. Method for ascertaining the place of a defect in the insulation of cables, consisting in placing a voltmeter in a shunt circuit of the closed circuit of the cable, adjusting the voltmeter by means of a resistance put in circuit of the cable so as to indicate the complete length of the cable in corresponding units of length, and finally switching the shunt circuit so as to connect one end with one terminal of the cable and the other end with the ground to indicate the distance of the place of defect from the said terminal in the same units of length.

JULIUS HEINRICH JOHANN
ADOLPF STEPHENSON.

Witnesses:
HERMANN PFEIFFER,
MAX F. A. KAEMPFF.